United States Patent [19]
Atsumi

[11] Patent Number: 5,482,235
[45] Date of Patent: Jan. 9, 1996

[54] CYMBAL CLAMPING DEVICE

[75] Inventor: Shizuo Atsumi, Hamamatsu, Japan

[73] Assignee: Yamaha Corporation, Shizuoka, Japan

[21] Appl. No.: 325,508

[22] Filed: Oct. 18, 1994

[30] Foreign Application Priority Data

Oct. 28, 1993 [JP] Japan ................. 5-062623 U

[51] Int. Cl.⁶ ................................................. F16L 3/00
[52] U.S. Cl. ................. 248/121; 248/230.6; 84/422.3
[58] Field of Search ........................ 248/121, 230; 84/422.3

[56] References Cited

U.S. PATENT DOCUMENTS 4,111,095  9/1978  Simons ........................ 84/422 R
4,185,808  1/1980  Donohoe et al. .......... 248/295 R
5,218,151  6/1993  Kurosaki ..................... 84/422.3
5,251,528  10/1993  Kurosaki ..................... 84/422.3

Primary Examiner—Leslie A. Braun
Assistant Examiner—Anita M. King
Attorney, Agent, or Firm—Koda and Androlia

[57] ABSTRACT

A cymbal clamping device used in a high-hat stand including a lock nut, a pair of felt washers for retaining a cymbal, and a clutch nut which are fitted on an attachment fixture mounted at the top end of the high-hat stand. A pair of parallel screw mounting brackets extend from one side of the lock nut so that the space between the screw mounting brackets is reduced when a clamp screw engaging with the screw mounting bracket is tightened so that the elastically deformed lock nut is positionally secured on the high-hat stand without getting loosened.

8 Claims, 7 Drawing Sheets

CYMBAL CLAMPING DEVICE

BACKGROUND OF THE INVENTION

1. Field of the Invention

The present invention relates to a cymbal clamping device in a high-hat stand which prevents the loosening of the cymbal due to vibration during play.

2. Prior Art

FIG. 7 shows a conventional high-hat stand for playing the cymbal by depressing a pedal.

This high-hat stand 1 substantially includes: a lower pipe 3 which is vertically installed on stand supporting legs 2 consisting of three (only one shown) foldable legs 2a which are connected to the lower pipe 3; an upper pipe 3 connected to the lower pipe 5 in a telescopic fashion so that the overall height of the stand 1 is adjusted by a butterfly screw 4; an extension rod 7 which slides inside the lower and upper pipes 3 and 5, the lower end of the extension rod 7 protruding out of the lower end of the lower pipe 3 so that it is linked to a pedal 6; and a return spring (not shown) installed inside the spring case 8 attached to the lower end of the lower pipe 3, the return spring urging the extension rod 7 upward so that the pedal 6 is endowed with a return inertia.

An upper cymbal 9 and a lower cymbal 10 are respectively attached, via an upper cymbal retainer 11 and a lower cymbal retainer 12, to the upper end part of the extension rod 7 which protrudes upward from the top end of the upper pipe 5.

Thus, when the extension rod 7 is pulled down by depressing the pedal 6 overcoming the force of the return spring, the upper cymbal 9 strikes the lower cymbal 10.

The Japanese utility Model Application Publication (Kokoku) No. 57-8059 discloses the upper cymbal retaining device 11 which fastens the upper cymbal 9 to the extension rod 7. FIG. 8 shows this retaining device.

In this retaining device, a hollow bolt 13 is fitted over the upper end portion of the extension rod 7, and a cylindrical piece 14 is screwed to the upper portion of the hollow bolt 13 via a clamping bolt 16 which is screwed into the screw hole 15 of the cylindrical piece 14. The extension rod 7 is thus fastened in place by being pressed against the inside circumferential surface of the upper-end opening of the cylindrical piece 14 by the clamping bolt 13.

A pair of felt washers 17 consisting of an upper washer and lower washer 17A and 17B are fitted over the hollow bolt 13 so that the upper cymbal 9 is held between the two washers 17A and 17B. A pair of lock nuts 18 consisting of upper and lower lock nuts 18A and 18B are provided between the felt washers 17 and the cylindrical piece 14 and screwed onto the hollow bolt 13. In addition, a clutch nut 19 is provided beneath the lower washer 17B so that it is screwed to the lower end of the hollow bolt 13. The felt washers 17 are thus clamped by the clutch nut 19 and the lock nuts 18, and the upper cymbal 9 is secured in place.

The hollow bolt 13 has a wide annular depression 20 in the middle portion of the outer circumferential surface. The depression 20 is as deep as or deeper than the bottom of external thread of the hollow bolt 13 so that the center hole of the upper cymbal 9 is positioned in this depression 20 for preventing the external thread of the hollow bolt 13 from being damaged by the rubbing movements between the upper cymbal 9 and the threaded surface of the hollow bolt 13.

The cylindrical piece 14 has a central hole 21 which is sufficiently larger, excluding the upper and lower opened ends, than the internal diameter of the hollow bolt 13. This allows a stronger grip of the extension rod 7 by the clamping bolt 16, so that shifting of the upper cymbal 9 that would be caused by the vibration during playing is prevented.

There is another type of cymbal stand which is not the type in which two cymbals are caused to strike each other by a pedal as in the high-hat stand as described above. In this cymbal stand of another type, only one cymbal (and not a pair) is installed on the stand.

The Japanese Utility Model Application Publication (Kokoku) No. 62-30064 discloses this type of cymbal stand.

In this cymbal stand, the center hole of the cymbal is fitted over a cymbal supporting rod which is installed on the upper part of the cymbal stand, and a butterfly nut is screwed onto a bolt part formed on a supporting rod so that the cymbal is clamped via a proper clamping force by a pair of felt-made upper and lower washers.

However, in the above-described types of cymbal stands, nuts are merely screwed onto the bolts to retain the cymbals. Accordingly, a large clamping torque is not obtained. Thus, when the cymbal is played for a long time, the nuts get loosened and may fall out due to the vibration caused by the striking impact of the cymbal.

SUMMARY OF THE INVENTION

The present invention was made in light of the problems seen in the conventional cymbal clamping device.

The object of the present invention is to provide a cymbal clamping device which can prevent the loosening of a lock nut that is caused by vibrations during playing, thus securing a stable playing of the cymbal over a long period of time.

The object of the present invention is accomplished by a unique structure for a cymbal clamping device used in a high-hat stand, and the clamping device includes a pair of upper and lower felt washers, which are fitted on a cylindrical attachment fixture of the high-hat stand, and a lock nut and a clutch nut which are respectively positioned above and below the felt washers on the attachment fixture. The lock nut is provided with an internal thread in the screw hole for engaging with the external thread of the attachment fixture and has a pair of screw mounting brackets which face each other with a clamping space, that extends from the screw hole, in between. The screw mounting brackets are connected to each other by a clamp screw so that the clamping space between the screw mounting brackets is narrowed, which causes the screw hole of the lock nut to be pressed against the external thread of the attachment fixture, positionally securing the lock nut on the high-hat stand.

In the present invention, the clamp screw is screwed into the screw hole formed in one of the two screw mounting brackets of the lock nut so as to connect the screw mounting brackets to each other and to narrow the clamping space. When the clamping space between the screw mounting brackets is thus narrowed by tightening the clamp screw, the lock nut is elastically bent so that the screw hole of the lock nut is pressed against the external thread of the attachment fixture, increasing the engaging frictional or gripping force on the attachment fixture.

DETAILED DESCRIPTION OF THE INVENTION

The present invention will be described below in detail with reference to the embodiments illustrated in the accompanying drawings.

Figure 5:
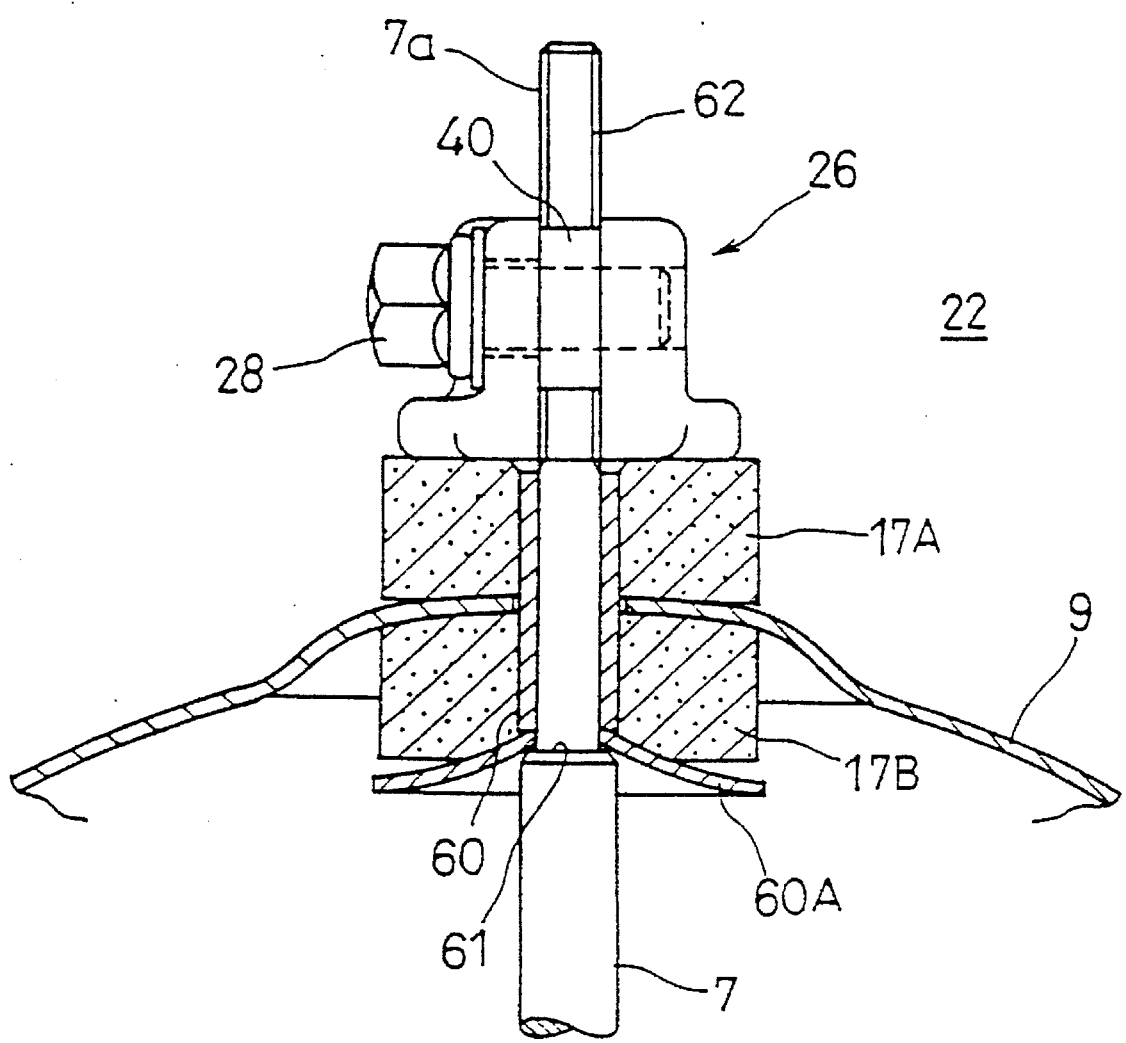
FIG. 5 is a cross section showing another embodiment of the cymbal clamping device according to the present invention.

The cymbal clamping device 22 shown in FIGS. 1 through 4 is used in a high-hat stand which is designed as shown in FIG. 5. A hollow bolt or an attachment fixture 13 is fitted on the extension rod 7 so that the clamping device 22 is mounted to this hollow bolt 13. The hollow bolt 13 is provided with an external thread 23 on the outer circumferential surface for its entire length.

A cylindrical piece 14 is screwed to the upper portion of the hollow bolt 13.

The cylindrical piece 14 has a central hole 21 in the axial direction so that the extension rod 7 passes through this hole 21. The cylindrical piece 14 is provided with an upper screw hole 15 which is radially oriented and opened into the central hole 21. A clamping bolt 16 is screwed into the upper screw hole 15 so that the clamping bolt 16 can push the extension rod 7 (towards left in FIG. 1). The extension rod 7 thus pushed is pressed against the inner circumferential surface of the central hole 21 of the cylindrical piece 14, and thus, the cylindrical piece 14 is secured to the extension rod 7 by the clamping bolt 16. The cylindrical piece 14 is further provided with a lower screw hole 25 that opens into the central hole 21. The screw hole 25 is formed in the circumferential wall of the cylindrical piece 14, and a fixing screw 24 is screwed into this screw hole 25 so that the cylindrical piece 14 is secured in place on the hollow bolt 13 by the fixing screw 24.

In this cylindrical piece 14, the diameter of the upper-end opening 21a opened at the top end of the central hole 21 is substantially equal to or at least slightly larger than the external diameter of the extension rod 7. An internal thread which engages with the external thread 23 of the hollow bolt 13 is formed on the inner surface of the lower-end opening 21b of the central hole 21. The diameter of the middle portion 21c of the central hole 21 (excluding the upper-end opening 21a and lower-end opening 21b) is sufficiently larger than the diameter of the extension rod 7.

Accordingly, when the clamping bolt 16 is screwed into the screw hole 15 and the end surface of the clamping bolt 16 presses against the extension rod 7, the inner surfaces of the openings 21a and 21b of the central hole 21 are pressed against the extension rod 7, and the cylindrical piece 14 is fastened in place more strongly to the extension rod 7.

In this embodiment, the hollow bolt 13 is used as an attachment fixture for the clamping device 22. However, the invention is not limited to this arrangement. The hollow bolt 13 and the cylindrical piece 14 can be in a single integral unit.

The clamping device 22 is comprised essentially of: a pair of felt washers 17, that is, the upper and lower washers 17A and 17B, which are fitted on the hollow bolt 13 and hold the upper cymbal 9; and a lock nut 26 and a clutch nut 27 which are respectively provided above and below the felt washers 17 and screwed onto the hollow bolt 13; and clamp screws 28 and 29 which respectively fasten the lock nut 26 and the clutch nut 27 to the hollow bolt 13.

Figure 2:
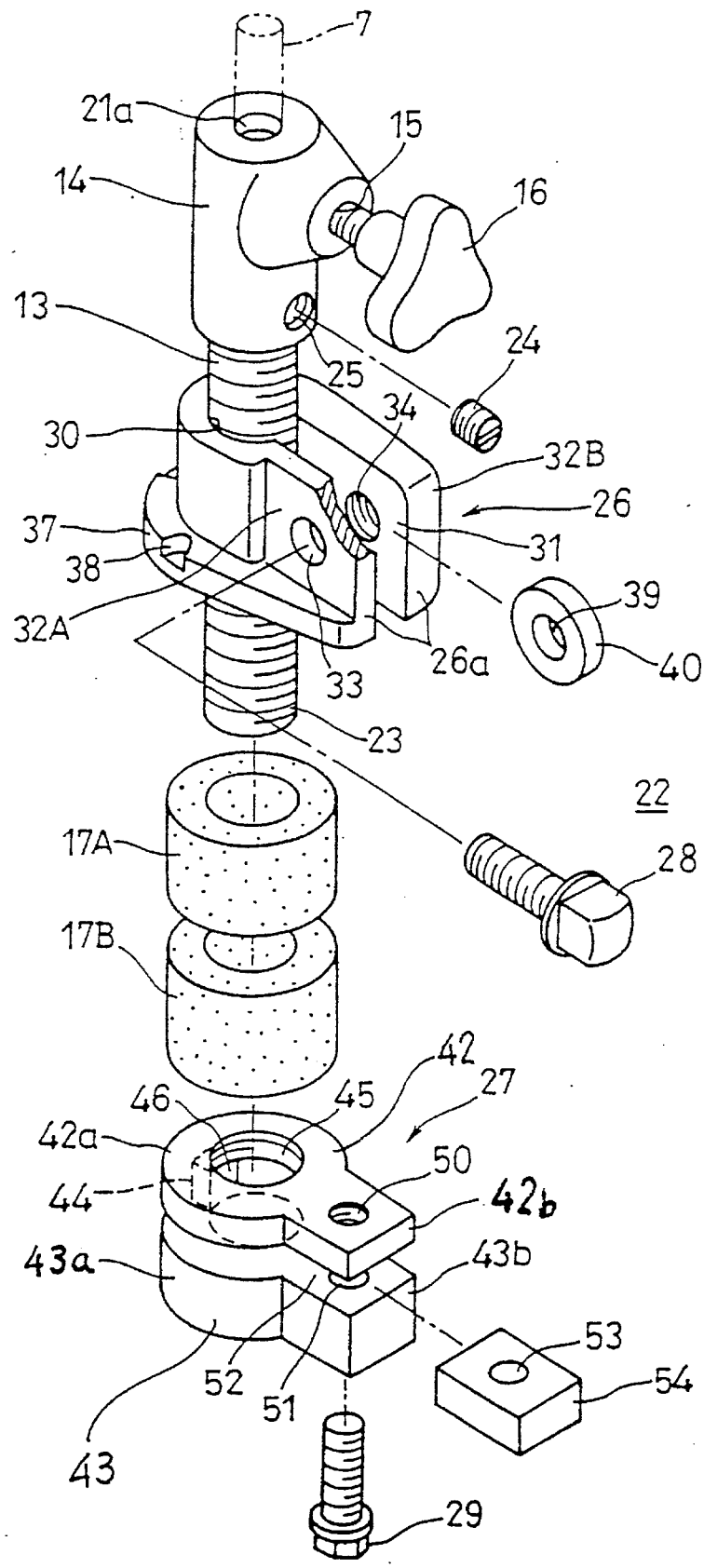
FIG. 2 is a partially cut-away disassembled perspective view of the clamping device shown in FIG. 1.
Figure 3:
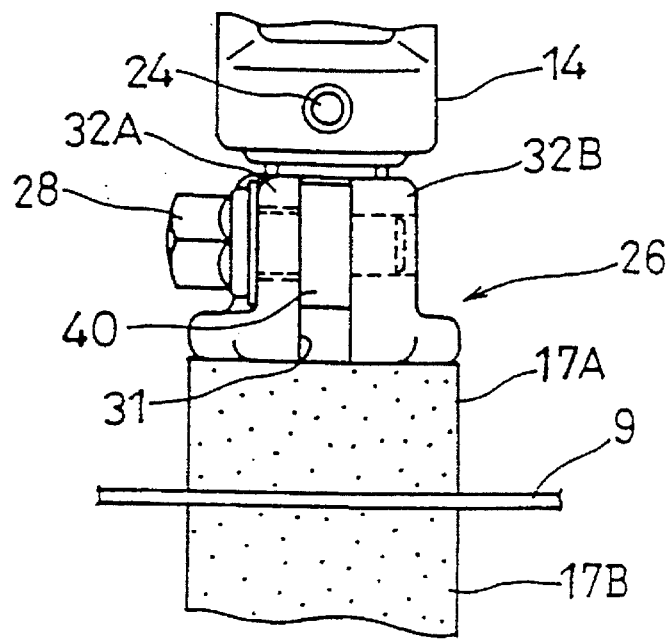
FIG. 3 is a side view of the lock nut used in the clamping device of FIG. 1.
Figure 4:
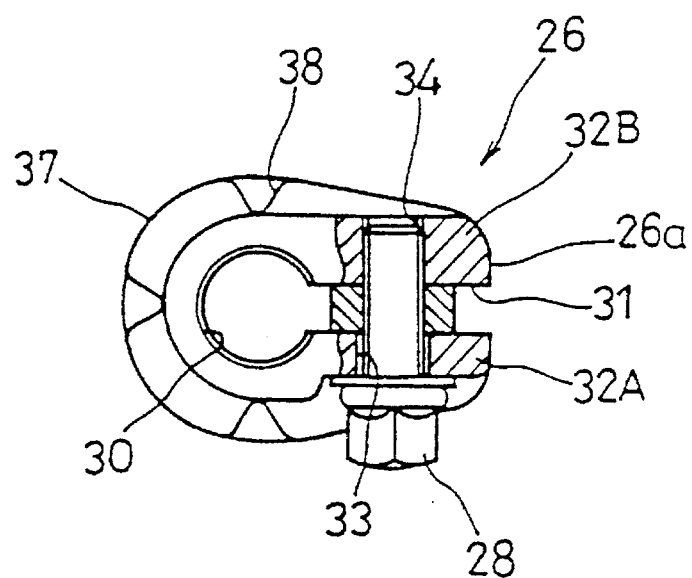
FIG. 4 is a partially cut-away top view of the clamping device of FIG. 1.

More specifically, the lock nut 26 is a U-shaped fastening member, as seen in FIG. 2, and includes a screw hole 30 and a clamping space 31. The screw hole 30 is at the circular end portion of the U-shaped lock nut 26 and has on its inner surface an internal thread that extends vertically from the top to the bottom of the lock nut 26 so as to engage with the external thread 23 of the hollow bolt 13. The clamping space 31 of the U-shaped lock nut 26 is an area defined by a pair of parallel screw mounting brackets 32A and 32B. These screw mounting brackets 32A and 32B are the same in height as the screw hole 30.

The screw mounting bracket 32A is provided with a screw attachment hole 33 so that the clamp screw 28 can pass through. In order to facilitate a bend or a deformation of the lock nut 26 when the clamp screw 28 is tightened, the screw mounting bracket 32A is formed thinner than the other screw mounting bracket 32B. The screw mounting bracket 32B is provided with a screw hole 34 which is horizontally coaxial to the screw attachment hole 33. Thus, the clamp screw 28 is brought into the screw hole 33 of the screw mounting bracket 32A and then screwed to the screw hole 34 of the screw mounting bracket 32B, thus connecting the two screw mounting brackets 32A and 32B.

Furthermore, the lock nut 26 is provided with a U-shaped flange 37 that is pressed against the upper felt washer 17A. The flange 37 projects outwardly from the entire outer and lower circumferential surface of the lock nut 26 except in the area of the end surfaces 26a of the screw mounting brackets 32A and 32B.

A plurality of recesses 38 are formed at intervals of roughly 90 degrees in the circumferential direction on the upper surface of the curved area of the flange 37, i.e., on the upper surface of the flange 37 around the screw hole 30. In the embodiment shown in FIG. 2, three recesses 38 (only two seen) are provided. These recesses 38 are used when the lock nut 26 is rotated.

A ring-form spacer 40 which is made of an elastic material such as rubber, etc. is inserted into the clamping space 31 of the lock nut 26. The spacer 40 has a through-hole 39 and is slightly thinner than the width of the clamping space 31. The spacer 40 is to prevent the lock nut 26 from being damaged by excessive deformation that would occur when the clamp screw 28 is tightened. However, it is not absolutely necessary to use the spacer 40.

Figure 1:
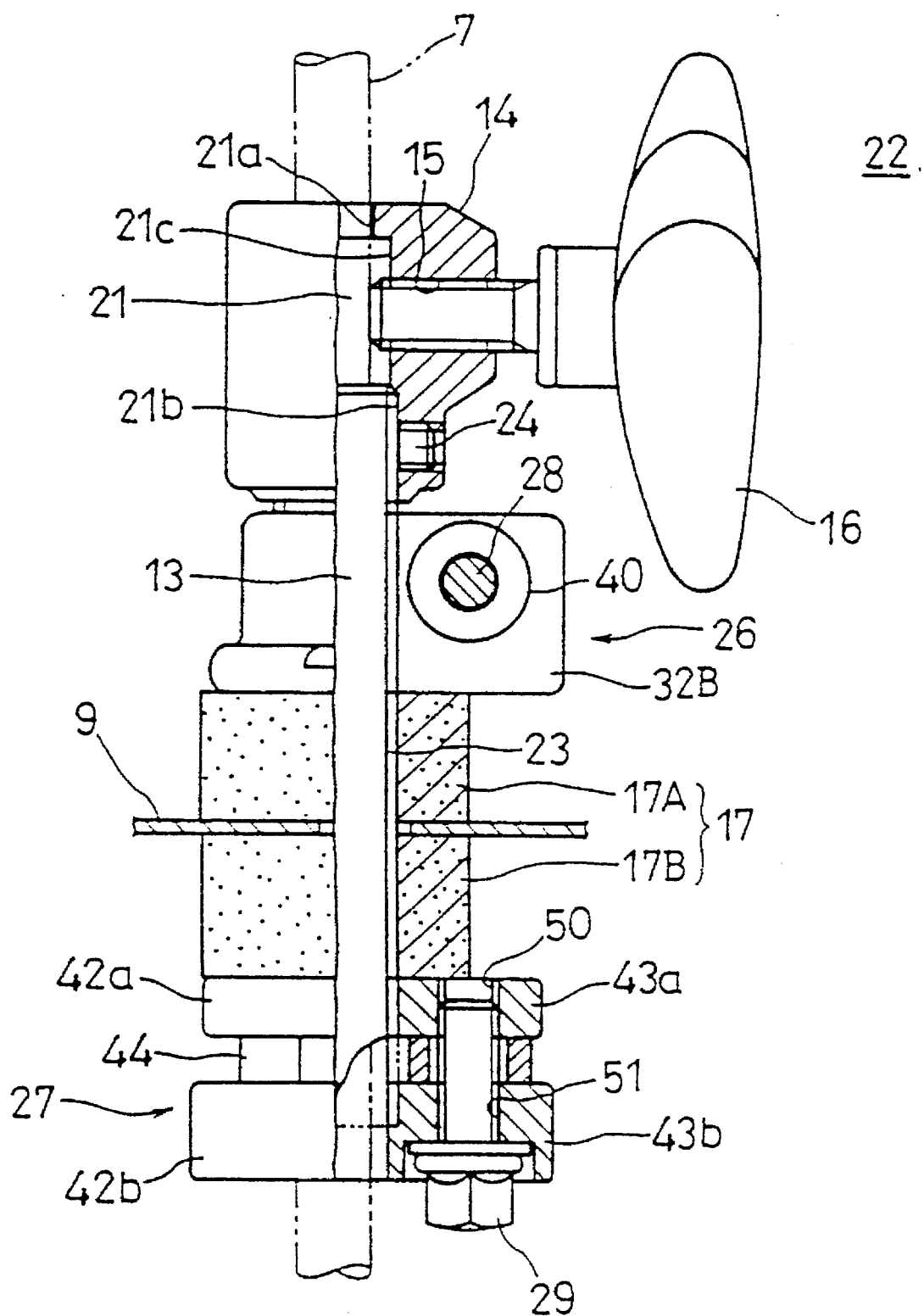
FIG. 1 is a cross-section of one embodiment of the cymbal clamping device for a high-hat stand according to the present invention.

The clutch nut 27 of the clamping device 22 is provided under the washers 17. The clutch nut 27 is key-hole shaped when viewed from above as seen in FIG. 2 and roughly angled C-shaped when viewed from the front as seen in FIG. 1.

The clutch nut 27 is made of an upper member 42, a bottom member 43 and a connecting member 44 which connects the upper and bottom members 42 and 43. The upper and bottom members 42 and 43 include circular portions 42a and 43b which face each other above and below and rectangular screw mounts 42b and 43b which extend respectively from the circular portions 42a and 43a so as to face each other above and below.

Screw holes 45 are respectively formed at the centers of the upper and lower circular portions 42a and 43a so as to be screwed to the external thread 23 of the hollow bolt 13. The connecting member 44 connects the circular portions 42a and 43a so as to be on the opposite side of the screw holes 45 from the screw mounts 42b and 43b. Internal thread 46 which engage with the external thread 23 of the hollow bolt 13 is formed on the inner surface of the connecting member 44. The internal thread 46 is not absolutely necessary, but it is advantageous to have the internal thread 46 in order to reduce rattling of the clutch nut 27.

The upper member 42 of the clutch nut 27 is as a whole made thinner than the lower member 43. As a result, the upper member 42 can be elastically bent or deformed in the direction of the thickness with the connecting member 44 functioning as a fulcrum.

A screw hole 50 is opened at the center of the screw mount 42b of the upper member 42 of the clutch nut 27 so that the clamp screw 29 is screwed to this screw hole 50. A screw attachment hole 51 is opened at the center of the rectangular screw mount 43b of the lower member 43 of the clutch nut 27 so that the clamp screw 29 can pass through this screw attachment hole 51. The screw hole 50 and the screw attachment hole 51 are vertically coaxial to each other.

Between the two screw mounts 42b and 43b is a clamping space 52, and a rectangular spacer 54 made of an elastic material such as rubber, etc. is placed in this clamping space 52. The spacer 54 has a through-hole 53 so that the clamp screw 29 can pass through. The spacer 54 is for preventing damage to the clutch nut 27 caused by an excessive tightening force that is applied when the clamp screw 29 is tightened. It is, however, not absolutely necessary to use the spacer 54.

With the above described structure, the upper cymbal 9 is clamped in place in the following manner:

The lock nut 26 is screwed to the hollow bolt 13 so as to be at the upper portion of the hollow bolt 13, and the clutch nut 27 is rotated so that the felt washers 17 as well as the upper cymbal 9 are set at a desired height.

Next, the clamp screw 29 is mounted to the clutch nut 27. In other words, the spacer 54 is set in the clamping space 52, and the clamp screw 29 is passed through the screw attachment hole 51 of the bottom member 43 and also the through-hole 53 of the spacer 54 and then screwed into the screw hole 50 of the upper member 42 of the clutch nut 27.

When the clamp screw 29 is thus screwed in, the top member 42 of the clutch nut 27 is elastically bent downward with the connecting member 44 functioning as a fulcrum, resulting in that the clamping space 52 narrows. Accordingly, the screw holes 45 of the clutch nut 27 are pressed against the external thread 23 of the hollow bolt 13, and the frictional force between the hollow bolt 13 and the clutch nut 27 is increased. Thus, the loosening of the clutch nut 27 that would be caused by vibration during playing is prevented.

As a result of the elastic deformation of the clutch nut 27, the frictional force between the clutch nut 27 and the clamp screw 29 is increased, and the loosening or falling out of the clamp screw 29 is prevented.

Next, the lock nut 26 is rotated and lowered on the hollow bolt 13 until the flange 37 of the lock nut 26 comes into contact with the upper felt washer 17A. The upper cymbal 9 is thus clamped and held by the upper and lower felt washers 17A and 17B.

Afterward, the clamp screw 28 is passed through the screw attachment hole 33 of the screw mounting bracket 32A of the lock nut 26 and the through-hole 39 of the spacer 40 and then screwed into the screw hole 34 of the screw mounting bracket 32B of the lock nut 26.

When the clamp screw 28 is thus screwed in, the screw mounting bracket 32A which is thinner than the other screw mounting bracket 32B of the lock nut 26 is elastically bent so that the clamping space 31 between two screw mounting brackets 32A and 32B narrows, thus causing the screw hole 30 to be pressed against the external thread 23 of the hollow bolt 13. As a result, the frictional force between the hollow bolt 13 and the lock nut 26 is increased, and the loosening of the lock nut 26 that would be caused by vibration during playing is prevented. In addition, as a result of the elastic deformation of the lock nut 26, the frictional force between the lock nut 26 and the clamp screw 28 is increased, and the loosening or falling out of the clamp screw 28 would not occur.

FIG. 5 shows another embodiment of the clamping device of the present invention applied to a high-hat stand having the upper cymbal 9 only.

In this embodiment, a stopper tube 60 that is provided with a flange 60A is fitted on the upper portion of the extension rod 7, and the upper cymbal 9 is fitted on the outer surface of this stopper tube 60 by being sandwiched by the upper and lower felt washers 17A and 17B. The same lock nut 26 as that shown and described in FIGS. 1 through 4 is fitted on and fastened to the upper end of the extension rod 7 in a manner that the upper felt washer 17A is pressed by the lock nut 26 against the upper cymbal 9.

In this case, the upper end portion 7a of the extension rod 7 functions as an attachment fixture for the clamping device 22. An external thread 62 to which the lock nut 26 is screwed is formed on the outer circumferential surface of the upper end portion 7a of the extension rod 7. The positioning of the stopper tube 60 on the extension rod 7 is made by the flange 60A of the stopper tube 60 sitting on the step 61 formed on the extension rod 7. The flange 60A of the stopper tube 60 is in the shape of, for example, a circular cone. Thus, the flange 60A can function as a clutch nut (such as the clutch nut 27 shown in FIG. 1), and the lower felt washer 17B is placed on the flange 60A.

In this clamping device 22 as well, the lock nut 26 is elastically deformed in the same fashion as in the previous embodiment when the clamp screw 28 is tightened, so that the lock nut 26 is pressed against and fastened to the outer circumferential surface of the upper end 7a of the extension rod 7, and the loosening of the lock nut 26 is prevented.

Figure 6:
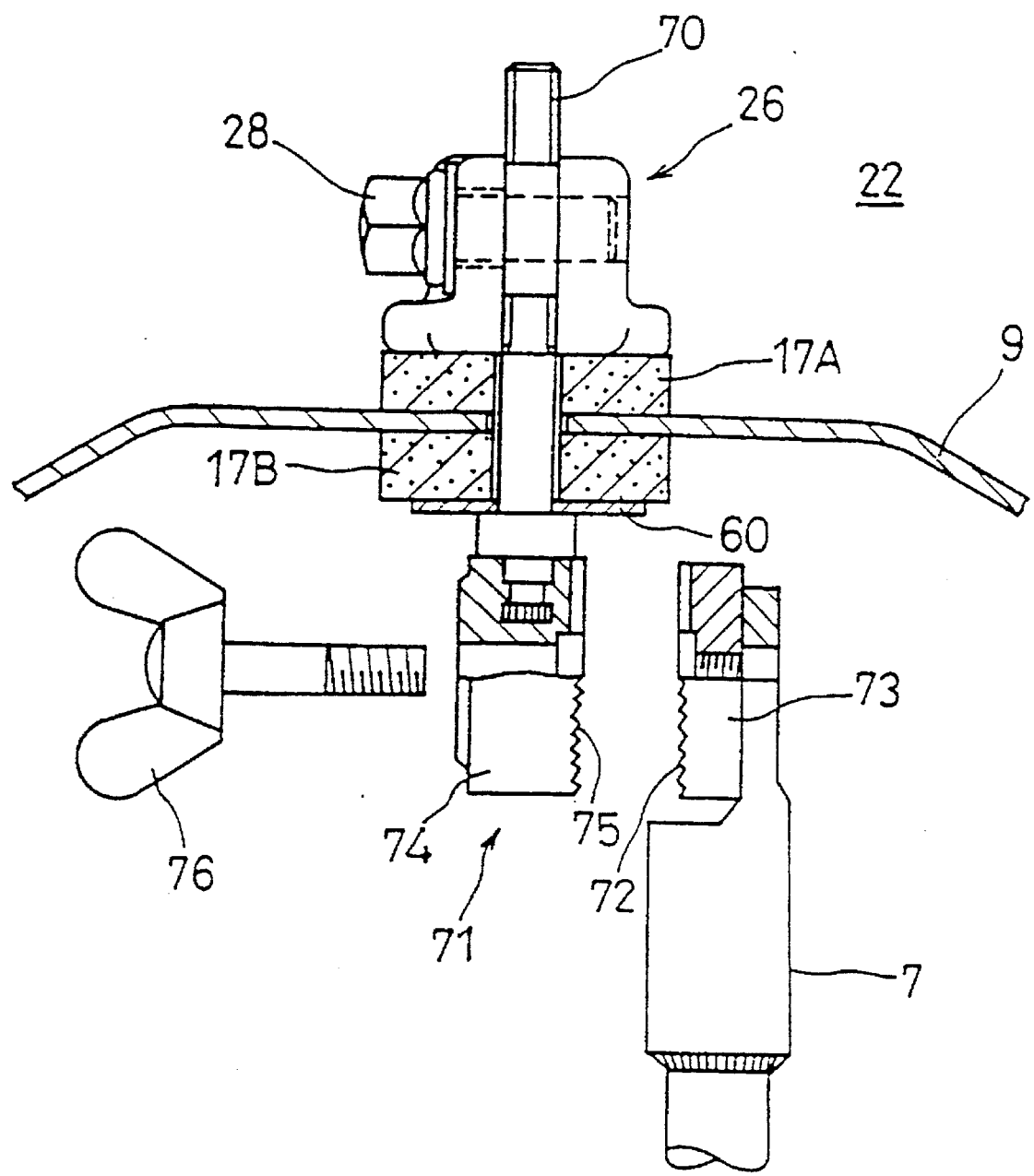
FIG. 6 is a disassembled cross section of still another embodiment of the cymbal device according to the present invention.
Figure 7:
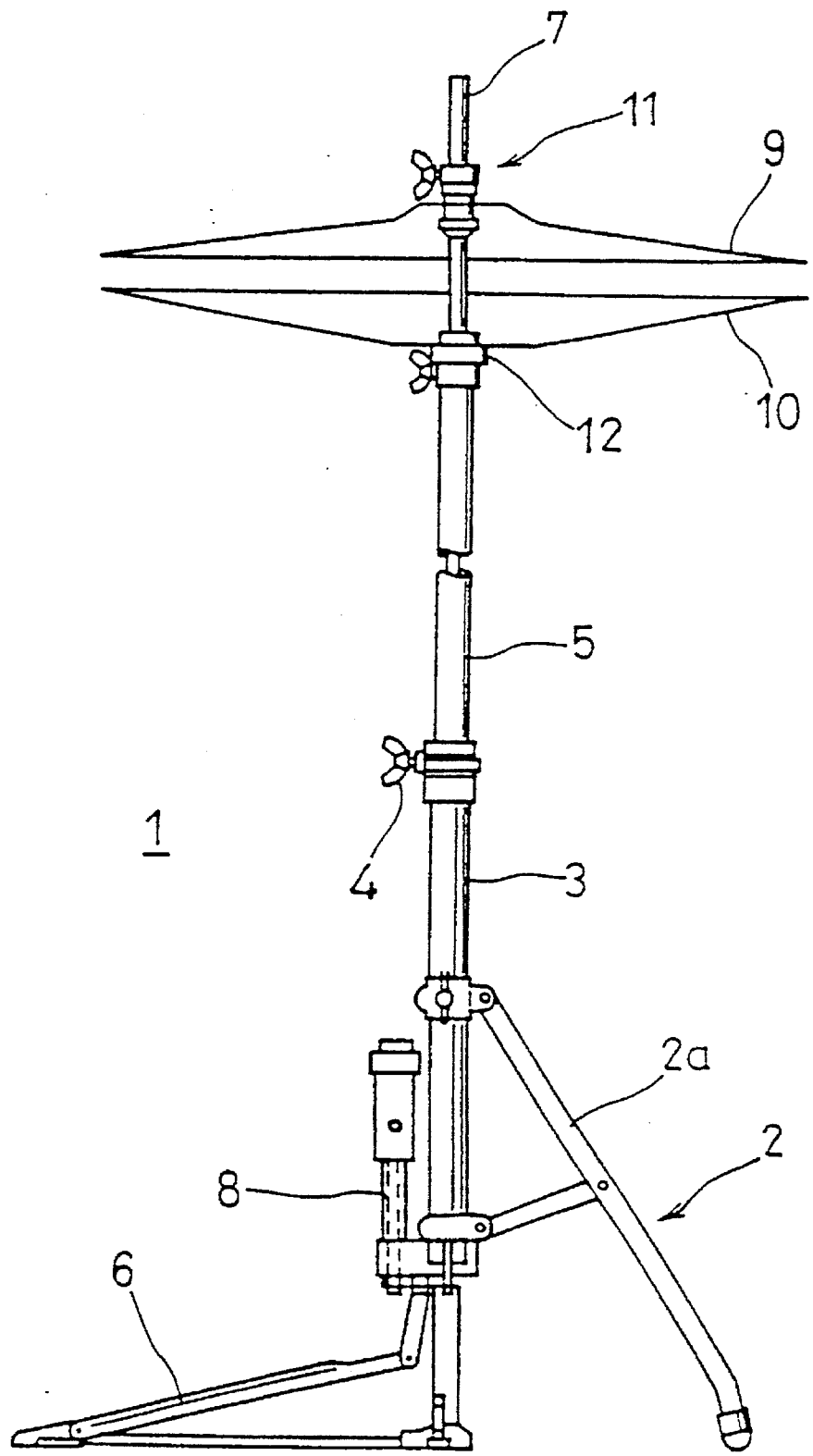
FIG. 7 shows an ordinary high-hat stand.
Figure 8:
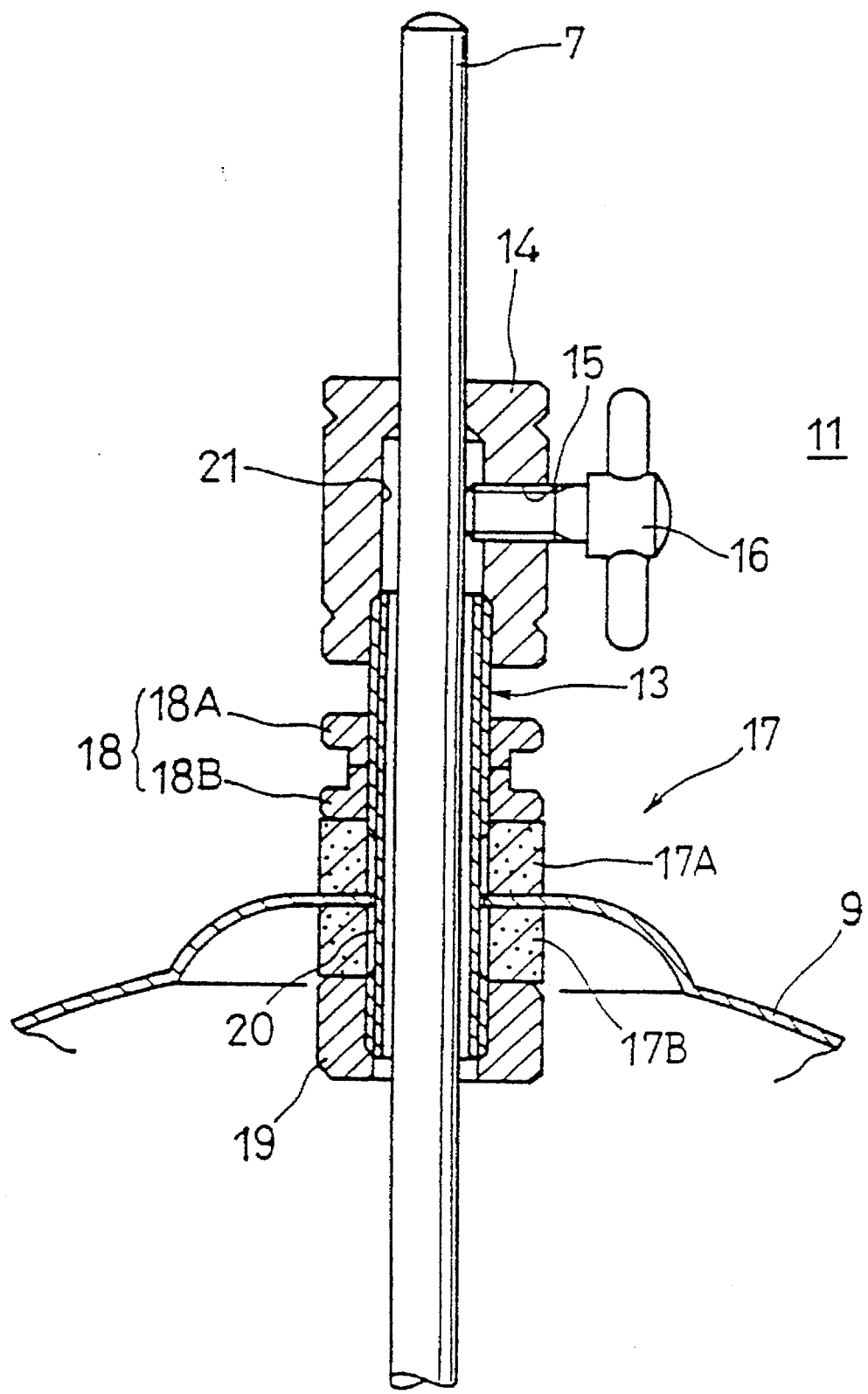
FIG. 8 is a cross section of a conventional cymbal retaining device.

FIG. 6 shows still another embodiment of the clamping device of the present invention. Like the embodiment illustrated in FIG. 5, the clamping device 22 of this embodiment is used in a high-hat stand involving the upper cymbal 9 only.

In this embodiment, the upper end of the extension rod 7 is separated from the main portion of the extension rod 7 and used as an attachment fixture for the clamping device 22. The attachment fixture 70 is attached to the extension rod 7 by a tilter 71 so that the angle of the attachment fixture 70 with respect to the vertical direction is freely adjusted.

The tilter 71 consists of a fixed tilter 73 and a fitting tilter 74. The fixed tilter 73 has teeth 72 formed on the front surface and is fixed to the extension rod 7. The fitting tilter 74 has teeth 75, which is to engage with the teeth 72 of the fixed tilter 73, and is attached to the lower end of the attachment fixture 70. The fitting tilter 74 is pressed against and fitted to the fixed tilter 73 by a butterfly bolt 76. The stopper 60 which hold the lower felt washer 17B thereon is a circular disk fitted on the attachment fixture 27, thus forming a clutch nut.

The remaining structure of this embodiment is similar to that of the embodiment illustrated in FIG. 5.

It goes without saying that an effect similar to that of the previous embodiments can be obtained by this structure of FIG. 6.

In the above described embodiments, only one screw mounting bracket 32A of the lock nut 26 is elastically deformable by being formed thinner than the other. However, it would be possible to make both screw mounting brackets 32A and 32B thin so as to be elastically deformable.

As seen from the above, according to the present invention, the lock nut of the cymbal clamping device is provided with a screw hole which engages with the external thread of an attachment fixture and with a pair of screw mounting brackets which face each other with a clamping space in between. The screw mounting brackets are connected to each other by a clamp screw, thus narrowing the clamping space so that the screw hole of the lock nut is pressed against the external thread of the attachment fixture. Accordingly, the frictional force between the attachment fixture and the lock nut can be large, and the loosening of the lock nut caused by vibration during the play can be prevented. Thus, the present invention can provide a cymbal clamping device free of positional displacement or shifting of the cymbals during the play, thus securing a stable playing over a long period of time.

The invention claimed is:

1. A cymbal clamping device being secured to an extension rod, said device for use in a high-hat stand that includes telescopic upper and lower pipes, legs attached to a lower end of said lower pipe and an extension rod provided in said upper and lower pipes, said cymbal clamping device comprising:

a cylindrical attachment fixture fitted on an upper end of said extension rod, said attachment fixture being provided with an external thread;

a pair of washers fitted on said attachment fixture for holding a cymbal in between;

a U-shaped lock nut screwed to said attachment fixture so as to be positioned above said washers, said lock nut having a pair of screw mounting brackets so that one of said screw mounting brackets has a screw attachment hole and another of said screw mounting brackets has a screw hole so that said screw attachment hole and screw hole are horizontally coaxial;

a first clamp screw brought into said screw hole of one of said screw mounting brackets and screwed to said screw hole of said another of said screw mounting brackets so that a distance between said two screw mounting brackets is decreased when said first clamp screw is tightened;

a clutch nut screwed to said attachment fixture so as to be positioned below said washers, said clutch nut having a pair of screw mounts so that one of said screw mounts has a screw attachment hole and another of said screw mounts has a screw hole so that said screw attachment hole and said screw hole are vertically coaxial; and a second clamp screw brought into said screw attachment hole and screwed to said screw hole of said clutch nut so that a distance between said two screw mounts is decreased when said second clamp screw is tightened.

2. The cymbal clamping device according to claim 1, wherein said another of said screw mounting brackets having said screw hole is thicker than one of said screw mounting brackets having said screw attachment hole.

3. The cymbal clamping device according to claim 1, wherein said screw mount of said clutch nut having said screw hole is thinner than said screw mount of said clutch nut having said screw attachment hole.

4. The cymbal clamping device according to claim 1, further comprising a spacer provided in a space between said pair of screw mounting brackets of said lock nut.

5. The cymbal clamping device according to claim 1, further comprising a spacer provided in a space between said two screw mounts of said clutch nut.

6. A cymbal clamping device being secured to an extension rod, said device for use in a high-hat stand that includes telescopic upper and lower pipes, legs attached to a lower end of said lower pipe and an extension rod provided in said upper and lower pipes, said cymbal clamping device comprising:

an attachment fixture provided at a top end of said extension rod;

a pair of washers fitted on said attachment fixture for holding a cymbal in between;

a U-shaped lock nut screwed to said attachment fixture so as to be above said washers, said lock nut having a pair of screw mounting brackets so that one of said screw mounting brackets has a screw attachment hole and another of said screw mounting brackets has a screw hole so that said screw attachment hole and screw hole are horizontally coaxial;

a clamp screw brought into said screw hole of one of said screw mounting brackets and screwed to said screw hole of said another of said screw mounting brackets so that a distance between said pair of screw mounting brackets is decreased when said clamp screw is tightened; and a clutch nut provided on said attachment fixture so as to be below said washers.

7. The cymbal clamping device according to claim 6, wherein said Clutch nut is a circular cone provided at a bottom of a stopper tube fitted on a step formed on said extension rod.

8. The cymbal clamping device according to claim 6, wherein said clutch nut is a circular disk fitted on said attachment fixture.

\* \* \* \* \*